April 3, 1956    J. L. REYNOLDS    2,740,233
MACHINE FOR FOIL PROTECTION OF PLANT GROWTH
Filed April 22, 1954    2 Sheets-Sheet 1
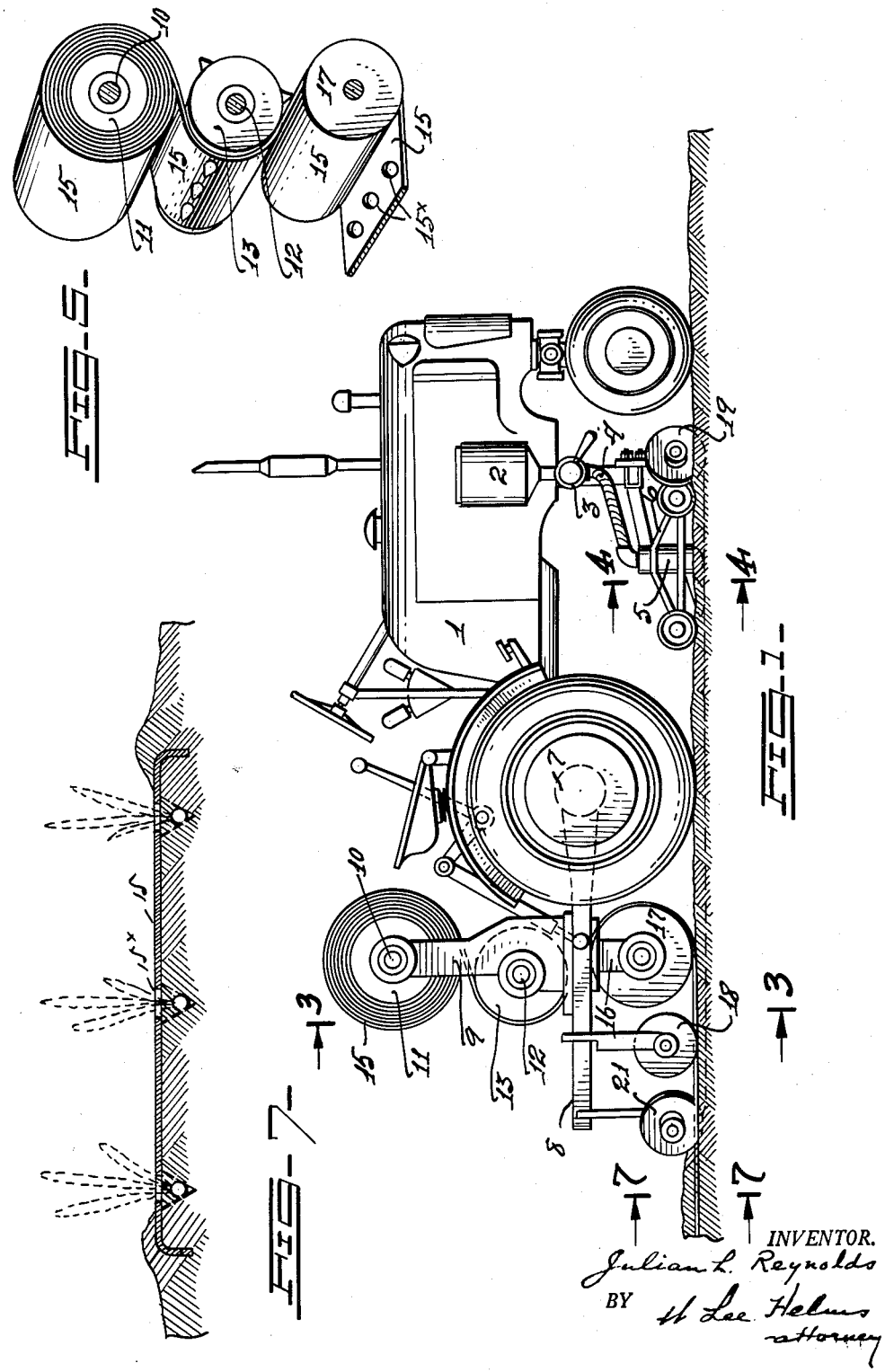
INVENTOR.
Julian L. Reynolds
BY H. Lee Helms
    Attorney

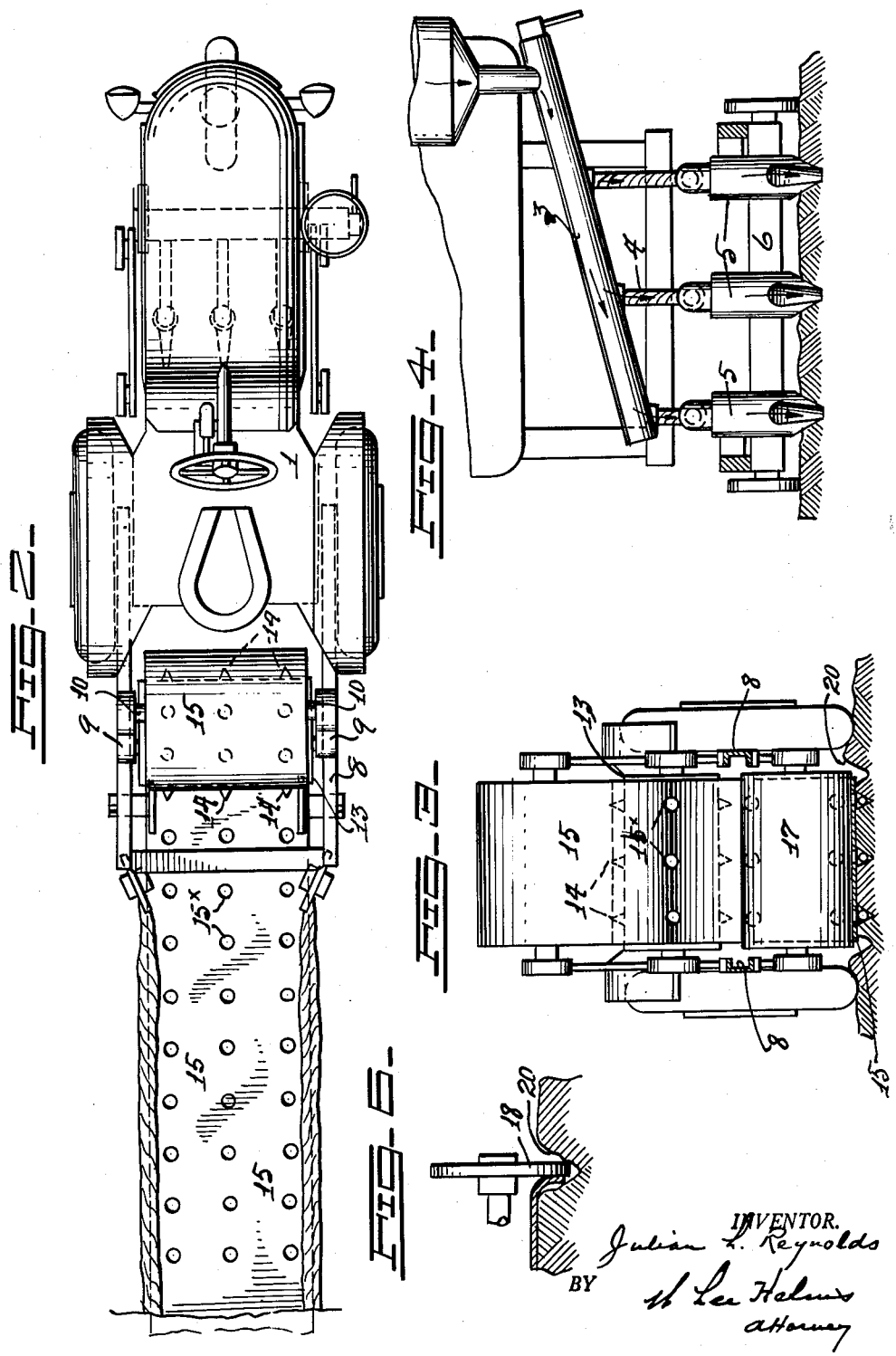

United States Patent Office 2,740,233
Patented Apr. 3, 1956

2,740,233

MACHINE FOR FOIL PROTECTION OF PLANT GROWTH

Julian L. Reynolds, Richmond, Va., assignor to Reynolds Metals Company, Richmond, Va., a corporation of Delaware Application April 22, 1954, Serial No. 424,850

1 Claim. (Cl. 47—9)

The rays of the sun extract moisture not only from the earth, but also from plant life. Thus, arid and desert land, even when irrigated, is often substantially useless for the growing of plant life because of rapid evaporation of moisture by the heat of the sun. The usual mulching is ineffective.

I have discovered that aluminum foil, alone or laminated to a reinforcing web, reflects from its surface such great proportion of the sun's rays, that when plant life is protected by aluminum foil, heat adsorption of the adjacent earth and the resultant evaporation of its moisture is so controlled that the use of arid regions for growing plant life is now feasible, even with little irrigation. Further, it is known that root structure is made stronger, and root action more prolific in cool soil than in hot soil.

It is the object of the present invention to provide a machine for laying the foil, the latter being relatively fragile and difficult to handle, and in one phase of the invention the foil may be prepared, as by forming apertures therein, to enable simultaneous seeding of the ground and relatively simultaneous application of the foil and the anchoring thereof at its margin.

The invention will be described with reference to the accompanying drawings, in which:

Fig. 1 is a view in elevation showing a machine adapted to carry out the method.

Fig. 2 is a top plan view of the machine.

Fig. 3 is a rear end elevation sectioned on the vertical lines 3—3, Fig. 1.

Fig. 4 is an enlarged, fragmentary view at the seeder area of the machine.

Fig. 5 is a schematic view showing the foil handling drums.

Fig. 6 is a schematic view in elevation showing the action of an anchoring disc for a foil margin, the foil and ground being shown in section.

Fig. 7, largely schematic, is a vertical section on the line 7—7, Fig. 1.

Referring to the drawings I have shown therein a tractor. This tractor may be of any suitable and usual form. The tractor carries a seeding attachment consisting of a seed hopper 2 discharging into a manifold 3 connected by a flexible hose 4 to the seeding shoes 5. The tractor is generally indicated at 1.

The seeder shoes may be supported by a wheeled carriage 6. Swiveled on the rear axle 7 of the tractor is a frame 8 on the horizontal standards of which are mounted opposed brackets 9. Between the brackets and supported thereby is a first shaft 10 adapted to carry a drum 11 on which is wound aluminum foil. The brackets support a second shaft, 12, which rotatably supports a drum 13 on which are preferably mounted rows of foil puncturing points 14 for the foil 15. Frame 8 carries a depending bracket 16 which rotatably supports a roller 17 under which the foil is led.

The frame 8 carries a pair of spaced foil anchoring discs 18, the action of which is best shown in Fig. 6. These discs act upon the margins of the foil strip and bend them downwardly into the earth. It is noted in Fig. 1 at 19 spaced furrow discs may be carried by the tractor assembly to form the furrow 20 shown in Fig. 6, and following the action of the anchoring discs 18 furrow closing discs 21, Fig. 1, may be employed.

The machine may be used to lay and anchor strips of foil at the sides and adjacent to growing plants, but in the embodiment shown the machine is primarily intended for application to the soil during the planting, and particularly seeding, operation. As the machine moves forward, three rows of seeds are deposited, as an example, and thereafter the foil strip is laid with the rows of perforations, at 15x, in line with the seeded rows, so that the plant growths may emerge through the holes in the foil, the latter being anchored at its margins.

In the planting of seedlings, as the machine moves forward the seedlings may be placed in the soil, through the openings 15, in the progress of laying the foil.

It will be understood that various modifications can be made in the form and arrangement of the elements forming the machine embodiment illustrated in the drawings, without departing from the spirit of the invention.

Having described my invention, what I claim and desire to secure by Letters Patent is as follows:

A machine for foil protection of plant growth consisting of a wheeled carrier, a frame on said carrier, two spaced bracket arms rising from said fame and two spaced bracket arms depending from the frame and substantially in line with said first-named bracket arms, three shafts, one carried by the depending bracket arms and two carried by the first-named bracket arms and consisting of an uppermost shaft adapted to hold a roll of metallic foil, and an immediate underlying shaft, a drum on the last-named shaft and having a plurality of foil-puncturing points, a roller on the shaft carried by the depending bracket arms, the assembly being arranged in such manner that a roll of foil, the foil-puncturing drum and the roller on the depending bracket arms are superimposed whereby the weight of the roll of foil and the weight of the foil-puncturing drum is superimposed upon the roller by the said brackets, the path of movement of the foil being directly from the shaft-supported roll of foil to the puncturing drum and thence around the roller, the roller in its pressure upon the foil being laid and thence directed to the surface of the ground being adapted to draw the foil into taut puncturing contact with the drum, as and for the purpose set forth.

References Cited in the file of this patent

UNITED STATES PATENTS

| | | |
|---|---|---|
| Re. 15,231 | Eckart | Nov. 22, 1921 |
| 1,471,796 | McGuire et al. | Oct. 23, 1923 |
| 1,562,353 | McGuire et al. | Nov. 17, 1925 |
| 2,669,804 | Cohen | Feb. 23, 1954 |

FOREIGN PATENTS

| | | |
|---|---|---|
| 527,812 | Germany | June 22, 1931 |